United States Patent [19]

Aishima et al.

[11] Patent Number: 4,574,104

[45] Date of Patent: Mar. 4, 1986

[54] MULTI-LAYER FILM

[75] Inventors: Takanori Aishima; Makoto Utsumi; Yoshihiro Ezaki, all of Sodegaura, Japan

[73] Assignee: Idemitsu Petrochemical Co., Ltd., Tokyo, Japan

[21] Appl. No.: 662,774

[22] Filed: Oct. 19, 1984

[30] Foreign Application Priority Data

Nov. 14, 1983 [JP] Japan ................................. 58-213550

[51] Int. Cl.[4] .............................................. B32B 3/00
[52] U.S. Cl. ...................................... 428/220; 428/35; 428/354; 428/349; 428/516; 156/244.11
[58] Field of Search ................. 428/516, 349, 35, 354, 428/220; 156/244.11

[56] References Cited

U.S. PATENT DOCUMENTS

| 4,346,834 | 8/1982 | Mazumdar | 428/349 |
| 4,367,841 | 1/1983 | Mazumdar | 428/349 |
| 4,399,180 | 8/1983 | Briggs et al. | 428/516 |

FOREIGN PATENT DOCUMENTS 69526 1/1983 European Pat. Off. .

Primary Examiner—Edith Buffalow
Attorney, Agent, or Firm—Frishauf, Holtz, Goodman & Woodward

[57] ABSTRACT

The present invention relates to a multi-layer film comprising at least three layers of two outer layers and an intermediate layer sandwiched therebetween wherein the intermediate layer is formed of a resin composition of a high density polyethylene and an ethylene α-olefin copolymer, and the outer layers are formed of an ethylene α-olefin copolymer and at least one of the outer layers is formed of a resin composition of an ethylene α-olefin copolymer and a low density polyethylene.

The object of the present invention is to provide a multi-layer film having a high mechanical strength and superior in properties such as heat sealability, antiblocking, and suitability for automatic packaging.

22 Claims, No Drawings

MULTI-LAYER FILM

BACKGROUND OF THE INVENTION

The present invention relates to a multi-layer film, and more particularly to a multi-layer film which has a high mechanical strength, can be reduced in thickness, and further is superior in properties such as heat sealability and anti-blocking.

Low or high density polyethylene films have heretofore been used as heavy duty packaging film materials for fertilizer, rice, wheat, and so forth. Low density polyethylene films produced by the high pressure polymerization method, however, is poor in mechanical strength and, therefore, it is inevitably necessary to increase their thickness. Similarly, high density polyethylene films have disadvantages in that a tear strength is not sufficiently high, sealability and puncture strength are not satisfactory and, furthermore, appearance is not good.

In order to overcome the above problems of polyethylene films and also to meet the requirement that the film thickness should be reduced from a viewpoint of saving resources, various single-layer or multi-layer films have been developed in recent years. Typical examples are (1) films produced by molding compositions comprising high density polyethylene and rubbers, (2) films comprising a layer formed of a low density polyethylene and a layer formed of a high density polyethylene in a laminated two-layer structure, (3) films comprising a layer formed of a resin composition composed of a high density polyethylene and an ethylene α-olefin copolymer and a layer formed of a low density polyethylene in a laminated two-layer structure, and (4) three-layer laminated films comprising two outer layers formed of a low density polyethylene and an intermediate layer formed of high density polyethylene as sandwiched between the outer layers.

These films, however, still have various disadvantages and are not sufficiently satisfactory for practical use. For example, the films (1) above are not satisfactory in mechanical strength and appearance, although sealability is improved. The films (2) have no special problems in connection with a mechanical strength and appearance, but are not always satisfactory in properties such as sealability, a puncture strength, and a practical strength at dropping. The films (3) are not sufficiently high in stiffness and also are not suitable for automatic packaging. Furthermore, bags with the low density polyethylene layer as an inner layer are readily subject to blocking and thus are inferior in opening properties. The films (4) are superior in optical properties but have disadvantages in that a puncture strength and sealability in packaging of heavy materials are not sufficiently satisfactory and blocking readily occurs.

SUMMARY OF THE INVENTION

The present invention is intended to overcome the above-described problems of the prior art and an object of the present invention is to provide a multi-layer film having a high mechanical strength and, furthermore, superior properties such as heat sealability, anti-blocking, and suitability for automatic packaging.

The present invention relates to a multi-layer film comprising at least three layers of two outer layers and an intermediate layer sandwiched therebetween wherein the intermediate layer is formed of a resin composition composed of a high density polyethylene and an ethylene α-olefin copolymer, and each of two outer layers is formed of an ethylene α-olefin copolymer and at least one of the two outer layers is formed of a resin composition composed of an ethylene α-olefin copolymer and a low density polyethylene produced by the high pressure polymerization method.

DETAILED DESCRIPTION OF THE INVENTION

The intermediate layer of the multi-layer film of the present invention is formed of a resin composition composed of a high density polyethylene and an ethylene α-olefin copolymer. The high density polyethylene as used herein have a density in the range of from 0.945 to 0.970 gram per cubic centimeter, preferably from 0.948 to 0.965 gram per cubic centimeter, and a melt index (MI) in the range of from 0.01 to 20 grams per ten minutes, preferably from 0.02 to 5 grams per ten minutes, and more preferably from 0.02 to 2 grams per ten minutes. The ethylene α-olefin copolymer is a linear low-density polyethylene produced by the low or intermediate pressure polymerization method, and has a density in the range of from 0.900 to 0,940 gram per cubic centimeter, preferably from 0.905 to 0.930 gram per cubic centimeter, and a melt index (MI) in the range of from 0.1 to 20 grams per ten minutes, preferably from 0.2 to 10 grams per ten minutes. The α-olefin content of the copolymer is usually from 1 to 20 percent by weight. α-Olefins which can be used are those having from 3 to 20 carbon atoms. Representative examples are propylene, butene-1, pentene-1, hexene-1, 4-methylpentene-1, ocetene-1, nonene-1, and decene-1.

The resin composition for the intermediate layer comprises from 90 to 10 percents by weight of the high density polyethylene and from 10 to 90 percents by weight of the ethylene α-olefin copolymer and preferably from 80 to 20 percent by weight of the high density polyethylene and from 20 to 80 percent by weight of the ethylene α-olefin copolymer. The mixing ratio of the high density polyethylene to the ethylene α-olefin copolymer can be determined appropriately within the above-specified range taking into consideration, e.g., the purpose for which the multi-layer film is used. If the proportion of the ethylene α-olefin copolymer is less than 10 percent by weight, a puncture strength and a tear strength are not sufficiently high. On the other hand, if it is in excess of 90 percent by weight, stiffness and suitability of automatic packaging are undesirably reduced. If the ethylene α-olefin copolymer is added in a proportion of not less than 50 percent by weight, there can be obtained a multi-layer film which has even higher impact resistance at a low temperature.

The resin composition for the intermediate layer is basically composed of the above high density polyethylene and ethylene α-olefin copolymer. If necessary, the composition may further contain a low crystallinity α-olefin copolymer. Addition of such low-crystallinitic α-olefin copolymers provides a large increase impact resistance, particularly in impact resistance at a low temperature. The low-crystallinity α-olefin copolymer as used herein has a density in the range of from 0.85 to 0.90 gram per cubic centimeter, preferably from 0.86 to 0.89 gram per cubic centimeter, a melt index (MI) in the range of from 0.01 to 50 grams per ten minutes, preferably from 0.05 to 20 grams per ten minutes, and a degree of crystallinity in the range of from 0 to 30 percent, preferably from 0 to 25 percent. If the density, melt index, and degree of crystallinity do not fall within the above-specified ranges, kneadability, moldability, physical properties, and so forth are undesirably inferior.

The said low-crystallinity α-olefin copolymer is a copolymer mainly composed of ethylene or propylene as the monomeric component copolymerized with other α-olefins. The α-olefins to be copolymerized with ethylene or propylene are not particularly limited including ethylene propylene, butene-1, pentene-1, hexene-1, octene-1, 4-methylpentene-1, decene-1, dodecene-1 and the like. Beside ethylene or propylene and the above mentioned α-olefins, the copolymer may comprise other types of monomeric constituents introduced by copolymerization with monomers copolymerizable therewith such as non-conjugated dienic monomers, e.g. 1,4-hexadiene, dicyclopentadiene, 5-methyl-2-norbornane and the like, and conjugated dienic monomers, e.g. butadiene, isoprene and the like. Particularly preferable in the present invention are the copolymers composed of ethylene or propylene and other α-olefins and copolymers thereof with copolymerizable dienic monomers of which the content of the α-olefins including ethylene and propylene is at least 80% by moles and the content of the α-olefins other than ethylene and propylene is in the range from 4 to 50% by moles or, preferably, from 5 to 40% by moles.

Exemplary of the suitable low-crystallinity α-olefin copolymer are an ethylene propylene copolymer, a propylene ethylene copolymer, an ethylene butene-1 copolymer, an ethylene propylene 1,4-hexadiene copolymer, an ethylene propylene 5-ethylidene-2-norbornane copolymer and the like. It is of course that these low-crystallinity α-olefin copolymers can be used either singly or as a combination of two kinds or more of those having different values density, melt index and degree of crystallinity including those prepared with different kinds of α-olefins.

The amount of the low crystallinity α-olefin copolymer added is from 1 to 30 parts by weight, preferably from 2 to 20 parts by weight per 100 parts by weight of above-described resin composition composed of the high density polyethylene and the ethylene α-olefin copolymer. If a resin composition with the low crystallinity α-olefin copolymer compounded thereto is used to prepare the intermediate layer, there can be obtained a multi-layer film which has even higher mechanical strength and impact resistance at a low temperature.

In the resin composition for the intermediate layer of the multi-layer film of the present invention, a low density polyethylene produced by the high pressure polymerization method, ethylene vinyl acetate copolymer and the like may be compounded in place of or in combination with the above low crystallinity α-olefin copolymer. This low density polyethylene produced by the high pressure polymerization method appropriately has a density in the range of from 0.910 to 0.940 gram per cubic centimeter, preferably from 0.915 to 0.930 gram per cubic centimeter, and a melt index (MI) in the range of from 0.05 to 20.0 grams per ten minutes, preferably from 0.1 to 10 grams per ten minutes.

In the multi-layer film of the present invention, comprising two outer layers and the intermediate layer sandwiched therebetween, each of the two outer layers is formed of an ethylene α-olefin copolymer and at least one of the outer layers is made of a resin composition composed of an ethylene α-olefin copolymer and a low density polyethylene produced by the high pressure polymerization method. Ethylene α-olefin copolymers for use in the two outer layers may be the same or different. These copolymers have a density and a melt index both falling within the same ranges as defined for the ethylene α-olefin copolymer constituting the intermediate layer, and are prepared using α-olefins having from 3 to 20 carbon atoms. The ethylene α-olefin copolymer for the outer layer may be the same as or different from that for the intermediate layer.

The low density polyethylene produced by the high pressure polymerization method to be used in at least one of the two outer layers appropriately has a density in the range of from 0.910 to 0.940 gram per cubic centimeter, preferably from 0.915 to 0.930 gram per cubic centimeter, and a melt index (MI) in the range of from 0.05 to 20.0 grams per ten minutes, preferably from 0.1 to 10 grams per ten minutes. The resin composition for at least one of the two outer layers comprises from 99 to 30 percent by weight of the ethylene α-olefin copolymer and from 1 to 70 percent by weight of the low density polyethylene produced by the high pressure polymerization method, preferably from 98 to 50 percent by weight of the former and from 2 to 50 percent by weight of the latter, and more preferably from 96 to 60 percent by weight of the former and from 4 to 40 percent by weight of the latter. In a case that the multi-layer film of the present invention is produced by an inflation method, it is preferred that the inner-most or inside layer of the multi-layer be made of the resin composition containing the low density polyethylene produced by the high pressure polymerization method, or when both the outer layers are made of the resin composition, the amount of the low density polyethylene produced by the high pressure polymerization method compounded be made greater in the inside layer than in the outside layer.

The multi-layer film of the present invention comprises at least three layers, two outer layer and the intermediate layer. If desired, the multi-layer film may further include one or more layers. For example, a layer made of low density polyethylene, a high density polyethylene, an ethylene-based copolymer (e.g., an ethylene unsaturated ester copolymer such as an ethylene vinyl acetate copolymer and an ethylene ethyl acrylate copolymer), or the like can be provided at a suitable location such as between the intermediate layer and the outer layer, or on the outside of the outer layer.

In a case that the multi-layer film of the present invention consists of the above three layers, i.e., the intermediate layer and the two outer layers, the thicknesses of the layers are usually chosen so that each outer layer constitutes from 2 to 60 percent, preferably from 5 to 50 percent, and more preferably from 10 to 50 percent of the total thickness of the three layers and the intermediate layer constitutes from 96 to 10 percent, preferably from 90 to 15 percent, and more preferably from 80 to 20 percent of the total thickness. When the multi-layer film is used as a heavy duty packaging bag, it is suitable that the intermediate layer constitute from 60 to 25 percent of the total thickness. As the thickness of the outer layer is increased, the thickness of the intermediate layer is correspondingly reduced and the mechanical strength of the resulting multi-layer film lowers. On the other hand, if the thickness of the outer layer is too small, the seal strength is undesirably lowers. The thickness of the multi-layer film is not critical; it is usually from about 10 to 300 microns, preferably from about 20 to 250 microns, and more preferably from about 20 to 200 microns.

The multi-layer film of the present invention can be produced by various techniques such as inflation and T-die molding. The multi-layer film is desirably produced by a procedure as described hereinafter taking into consideration, in particular, its application as a packaging bag.

Resin materials for the layers of the objective multi-layer film are each kneaded by molten kneading, for example, and then they are co-extruded using a die of the in-die adhesion type and molded by an inflation method to produce the multi-layer film. In producing a multi-layer film having a thickness of 100 microns or more, the inflation molding is performed at a blow up ratio of from 1.1 to 3.5, preferably from 1.1 to 3.0. If the blow up ratio is in excess of 3.5, there can be obtained only a multi-layer film in which waviness is developed in heat-sealed areas; that is, appearance is deteriorated. Furthermore, bags made of such a multi-layer film are not suitable for transportation in an empty state since they are increased in thickness at the heat-sealed side; i.e., they become bulky owing to the waviness.

The multi-layer film of the present invention has various advantages over conventional films. For example, the multi-layer film has a very high mechanical strength (such as tensile strength and impact strength, particularly tear strength) and, therefore, can be reduced in thickness as compared with the conventional films. This leads to a reduction in production costs of the multi-layer film and, furthermore, contributes to resources-saving. The multi-layer film has good heat sealability; seal strength is high and seal shrinkage is small. The multi-layer film has good contaminant-sealing properties and thus is useful as a bag for packaging a powder containing material, for example. The multi-layer film has good anti-blocking properties and thus is superior in opening properties when used as a bag. Furthermore, the multi-layer film is superior in stackability since its external surface has suitable blocking properties. Since the multi-layer film is superior in stiffness to linear low density polyethylene films, it has good automatic packaging properties.

Thus the multi-layer film of the present invention is very useful as a packaging film, particularly a film for packaging a heavy material.

The present invention is described in greater detail with reference to the following examples.

EXAMPLES 1 TO 10, AND COMPARATIVE EXAMPLES 1 TO 4

Resin materials for an intermediate layer and two outer layers (an inside layer and an outside layer) as shown in Table 1 were melted and kneaded in the corresponding three extruders (diameter, 40 millimeters), extruded through a circular die of the in-die adhesion type (die diameter: 200 millimeters; lip clearance: 2 millimeters; die temperature: 180 degrees centigrade), and then inflation-molded at a given blow up ratio to produce a multi-layer film.

EXAMPLES 11 to 20

Multi-layer films shown in Table 2 were produced in the same manner as in Example 1 except that the blow up ratio was set at 1.7, and the film thickness was adjusted to 140 microns.

The multi-layer films obtained in Examples 1 to 20 and Comparative Examples 1 to 4 were tested for various physical properties as described below. The results are shown in Tables 1 and 2.

Tensile property: measured according to JIS Z1702.
Tear strength: measured according to JIS Z1702.
Puncture strength: measured according to JIS P8134.
Low temperature: dropping test.

A 440 millimeters by 660 millimeters (440 mm x 660 mm) bag was charged with 20 kilograms of chemical fertilizer, heat-sealed at 200 degrees centigrade, and then allowed to stand at −10 degrees centigrade for 10 hours. Then the bag was dropped on a concrete floor from a height of 1.2 meters and examined if it was broken. The rating was defined as follows:
3: No breakage
2: Breakage of less than 50 percent
1: Breakage of more than 50 percent

COMPARATIVE EXAMPLE 5

A single layer film composed of a low density polyethylene produced by the high pressure polymerization method having a thickness of 200 microns was tested for various physical properties as described above. The results are shown in Table 2.

TABLE 1

| Run No. | Inside Layer | | Intermediate Layer | | Outside Layer | | Thickness Ratio (Inside Layer/ Intermediate Layer/ Outside Layer) | Total Thickness (microns) | Blow Ratio |
| --- | --- | --- | --- | --- | --- | --- | --- | --- | --- |
| Comparative Example 1 | LDPE*1 | | HDPE*6<br>LLDPE(A) | 60<br>40 | LDPE | | 4/4/2 | 130 | 1.6 |
| Comparative Example 2 | LLDPE(A)*2 | | HDPE<br>LLDPE(A) | 60<br>40 | LLDPE(A) | | 4/4/2 | 130 | 1.6 |
| Example 1 | LLDPE(A)<br>LDPE | 70<br>30 | HDPE<br>LLDPE(A) | 60<br>40 | LLDPE(A) | | 4/4/2 | 130 | 1.6 |
| Example 2 | LLDPE(A)<br>LDPE | 80<br>20 | HDPE<br>LLDPE(A) | 60<br>40 | LLDPE(A) | | 4/3/3 | 130 | 1.6 |
| Example 3 | LLDPE(A)<br>LDPE | 80<br>20 | HDPE<br>LLDPE(A) | 65<br>35 | LLDPE(A) | | 4/3/3 | 140 | 1.8 |
| Comparative Example 3 | LLDPE(B)*3 | | HDPE<br>LLDPE(B) | 55<br>45 | LLDPE(B) | | 4/3/3 | 140 | 1.8 |
| Example 4 | LLDPE(B)<br>LDPE | 80<br>20 | HDPE<br>LLDPE(B) | 55<br>45 | LLDPE(B) | | 4/3/3 | 140 | 1.8 |
| Example 5 | LLDPE(B)<br>LDPE | 80<br>20 | HDPE<br>LLDPE(B) | 55<br>45 | LLDPE(B)<br>LDPE | 95<br>5 | 4/3/3 | 140 | 1.8 |
| Example 6 | LLDPE(B)<br>LDPE | 80<br>20 | HDPE<br>LLDPE(B) | 55<br>45 | LLDPE(B)<br>LDPE | 90<br>10 | 4/3/3 | 140 | 1.8 |
| Example 7 | LLDPE(B)<br>LDPE | 75<br>25 | HDPE<br>LLDPE(B) | 55<br>45 | LLDPE(B)<br>LDPE | 95<br>5 | 4/3/3 | 140 | 1.8 |
| Example 8 | LLDPE(B)<br>LDPE | 75<br>25 | HDPE<br>LLDPE(B) | 55<br>45 | LLDPE(B)<br>LDPE | 90<br>10 | 4/3/3 | 140 | 1.8 |

TABLE 1-continued

| | | | | | | | | | |
|---|---|---|---|---|---|---|---|---|---|
| Example 9 | LLDPE(C)*4 | 80 | HDPE | 55 | LLDPE(C) | | | 4/3/3 | 140 | 1.8 |
| | LDPE | 20 | LLDPE(B) | 45 | | | | | | |
| Comparative Example 4 | LLDPE(D)*5 | | HDPE | 60 | LLDPE(D) | | | 2/6/2 | 50 | 4.0 |
| | | | LLDPE(D) | 40 | | | | | | |
| Example 10 | LLDPE(D) | 80 | HDPE | 60 | LLDPE(D) | 90 | | 2/6/2 | 50 | 4.3 |
| | LDPE | 20 | LLDPE(D) | 40 | LDPE | 10 | | | | |

| Run No. | Elmendorf Tear Strength MD/TD (kg/cm) | Modulus of Elasticity MD/TD (kg/cm$^2$) | Tensile Strength MD/TD (kg/cm$^2$) | Elongation (percents) MD/TD | Puncture Strength (kg · cm/cm) | Anti-Blocking Properties*7 | |
|---|---|---|---|---|---|---|---|
| | | | | | | Inside Layer to Inside Layer | Outside Layer to Outside Layer |
| Comparative Example 1 | 31.3/impossible to measure | 3970/4720 | 273/291 | 309/610 | 6410 | 4 | 4 |
| Comparative Example 2 | 68.4/impossible to measure | 4510/6040 | 357/371 | 520/750 | 8140 | 1 | 2 |
| Example 1 | 53.5/impossible to measure | 4350/5510 | 366/374 | 540/720 | 7600 | 4 | 2 |
| Example 2 | 52.2/impossible to measure | 4720/5610 | 365/395 | 510/800 | 6890 | 3 | 2 |
| Example 3 | 83.4/impossible to measure | 3320/3820 | 370/392 | 670/840 | 6720 | 3 | 2 |
| Comparative Example 3 | 89.1/impossible to measure | 2770/3210 | 378/394 | 620/890 | 12900 | 1 | 2 |
| Example 4 | 80.7/impossible to measure | 2810/3180 | 368/382 | 600/820 | 13100 | 3 | 2 |
| Example 5 | 76.3/impossible to measure | 2810/3200 | 369/385 | 550/840 | 14600 | 3 | 3 |
| Example 6 | 72.4/impossible to measure | 2850/3160 | 376/390 | 560/860 | 15700 | 3 | 4 |
| Example 7 | 69.4/impossible to measure | 2760/3240 | 370/392 | 540/860 | 14900 | 4 | 3 |
| Example 8 | 67.8/impossible to measure | 2720/3230 | 372/400 | 520/880 | 15600 | 4 | 4 |
| Example 9 | 80.8/impossible to measure | 3220/3680 | 348/368 | 610/830 | 5100 | 3 | 2 |
| Comparative Example 4 | 32/80 | 5800/6100 | 350/420 | 620/810 | 13000 | 3 | 3 |
| Example 10 | 30/68 | 5850/6180 | 382/436 | 610/790 | 12100 | 4 | 4 |

*1LDPE: Low density polyethylene produced by the high pressure polymerization method (density: 0.920 gram per cubic centimeter; melt index (MI): 0.3 gram per ten minutes) manufactured by Toyo Soda Co., Ltd. and sold under the trade name of Petrothene 172.
*2LLDPE(A): Ethylene-4-methylpentene-1 copolymer (density: 0.920 gram per cubic centimeter; melt index (MI): 2.2 grams per ten minutes) manufactured by Mitsui Sekyu Kagaku Kogyo Co., Ltd. and sold under the trade name of Ultzex 2021 L.
*3LLDPE(B): Ethylene octene-1 copolymer (density: 0.924 gram per cubic centimeter; melt index (MI): 1.3 grams per ten minutes) manufactured by DSM Corp. and sold under the trade name of Stamylex 1016.
*4LLDPE(C): Ethylene octene-1 copolymer (density: 0.922 gram per cubic centimeter; melt index (MI): 1.9 grams per ten minutes) manufactured by DSM Corp. and sold under the trade name of Stamylex 1026.
*5LLDPE(D): Ethylene butene-1 copolymer (density: 0.921 gram per cubic centimeter; melt index (MI): 3.7 grams per ten minutes) manufactured by DSM Corp. and sold under the trade name Stamylex 1048.
*6HDPE: High density polyethylene (density: 0.950 grams per cubic centimeter; melt index (MI): 0.05 gram per ten minutes) manufactured by Idemitsu Sekyu Kagaku Co., Ltd. and sold under the trade name of Idemitsu Polyethylene 640 UF.
*7The anti-blocking varies depending on a film thickness, for example.
4 . . . Excellent
3 . . . Good
2 . . . Fair
1 . . . Bad

TABLE 2

| Run No. | Inside Layer | | Intermediate Layer | | Outside Layer | | Thickness Ratio (Inside Layer/Intermediate Layer/Outside Layer) |
|---|---|---|---|---|---|---|---|
| Example 11 | LLDPE(B)*1 | 85 | LLDPE(B) | 60 | LLDPE(B) | 95 | 4/3/3 |
| | LDPE*2 | 15 | HDPE*3 | 40 | LDPE | 5 | |
| Example 12 | LLDPE(B)*1 | 85 | LLDPE(B) | 65 | LLDPE(B) | 95 | 4/3/3 |
| | LDPE*2 | 15 | HDPE | 35 | LDPE | 5 | |
| Example 13 | LLDPE(B)*1 | 85 | LLDPE(B) | 70 | LLDPE(B) | 95 | 4/3/3 |
| | LDPE*2 | 15 | HDPE | 30 | LDPE | 5 | |
| Example 14 | LLDPE(B)*1 | 85 | LLDPE(B) | 75 | LLDPE(B) | 95 | 4/3/3 |
| | LDPE*2 | 15 | HDPE | 25 | LDPE | 5 | |
| Example 15 | LLDPE(B)*1 | 85 | LLDPE(B) | 65 | LLDPE(B) | 95 | 4/3/3 |
| | LDPE*2 | 15 | HDPE | 30 | LDPE | 5 | |
| | | | LDPE | 5 | | | |
| Example 16 | LLDPE(B)*1 | 85 | LLDPE(B) | 45 | LLDPE(B) | 95 | 4/3/3 |
| | LDPE*2 | 15 | HDPE | 55 | LDPE | 5 | |
| Example 17 | LLDPE(B)*1 | 85 | LLDPE(B) | 55 | LLDPE(B) | 95 | 4/3/3 |
| | LDPE*2 | 15 | HDPE | 40 | LDPE | 5 | |
| | | | EPR*5 | 5 | | | |
| Example 18 | LLDPE(B)*1 | 85 | LLDPE(B) | 50 | LLDPE(B) | 95 | 4/3/3 |
| | LDPE*2 | 15 | HDPE | 40 | LDPE | 5 | |
| | | | EPR | 10 | | | |
| Example 19 | LLDPE(B)*1 | 85 | LLDPE(B) | 25 | LLDPE(B) | 95 | 4/3/3 |
| | LDPE*2 | 15 | HDPE | 60 | LDPE | 5 | |
| | | | EPR | 15 | | | |
| Example 20 | LLDPE(D)*4 | 80 | LLDPE(D) | 50 | LLDPE(B) | | 4/3/3 |
| | LDPE | 20 | HDPE | 40 | | | |
| | | | EPR | 10 | | | |
| Comparative Example 5 | LDPE*2 | | — | | — | | Single layer |

| | Tensile Strength MD/TD | Modulus of Elasticity MD/TD | Elongation MD/TD | Tear Strength MD/TD | Puncture Strength | Low Temperature Dropping Test*6 | |
|---|---|---|---|---|---|---|---|
| | | | | | | Lateral | Longitudinal |

TABLE 2-continued

| Run No. | (kg/cm²) | (kg/cm²) | (percents) | (kg/cm) | (kg · cm/cm) | Drop | Drop |
|---|---|---|---|---|---|---|---|
| Example 11 | 395/397 | 3400/4000 | 700/850 | 100/impossible to measure | 9100 | 3 | 3 |
| Example 12 | 392/390 | 3400/3800 | 710/850 | 104/impossible to measure | 9000 | 3 | 3 |
| Example 13 | 403/405 | 3300/3700 | 720/870 | 102/impossible to measure | 9500 | 3 | 3 |
| Example 14 | 399/384 | 3200/3600 | 710/840 | 100/impossible to measure | 10100 | 3 | 3 |
| Example 15 | 399/387 | 3100/3500 | 680/840 | 96.7/impossible to measure | 12800 | 3 | 3 |
| Example 16 | 369/385 | 2800/3200 | 550/840 | 76.1/impossible to measure | 14600 | 2 | 3 |
| Example 17 | 396/399 | 3300/3500 | 700/850 | 102/impossible to measure | 12600 | 3 | 3 |
| Example 18 | 393/398 | 3200/3600 | 690/860 | 110/impossible to measure | 12300 | 3 | 3 |
| Example 19 | 403/397 | 3600/3500 | 670/840 | 108/impossible to measure | 13800 | 3 | 3 |
| Example 20 | 389/394 | 3200/3300 | 695/860 | 104/impossible to measure | 12000 | 3 | 3 |
| Comparative Example 5 | 281/242 | 2620/3480 | 400/660 | 20.1/35.6 | 3300 | 1 | 1 |

*[1]LLDPE(B): Same as LLDPE in Table 1 (*[3]).
*[2]LDPE: Same as LDPE in Table 1 (*[1]).
*[3]HDPE: Same as HDPE in Table 1 (*[6]).
*[4]LLDPE(D): Same as LLDPE(D) in Table 1 (*[5]).
*[5]EPR: Ethylene propylene diene copolymer (Mooney viscosity $ML_{1+4}$ (100° C.): 88) manufactured by Nippon Gosei Gomu Co., Ltd. and sold under the trade name of EP57P.
*[6]Lateral Drop: The bag was dropped in a state that it was held laterally.
Longitudinal Drop: The bag was dropped in a state that it was held longitudinarlly.

What is claimed is:

1. A multi-layer film comprising at least three layers, said three layers comprising two outer layers and an intermediate layer positioned between said outer layers, said intermediate layer being a resin composition comprising from 90 to 10% by weight of a high density polyethylene and from 10 to 90% by weight of an ethylene α-olefin copolymer, each of said two outer layers comprises an ethylene α-olefin copolymer and at least one of said two outer layers is a resin composition comprising from 98 to 50% by weight of an ethylene α-olefin copolymer and from 2 to 50% by weight of a low density polyethylene produced by the high pressure polymerization method.

2. The multi-layer film of claim 1, wherein said intermediate layer resin composition also contains a low density polyethylene produced by the high pressure polymerization method.

3. The multi-layer film of claim 1, wherein said intermediate layer resin composition also contains a low-crystallinity α-olefin copolymer.

4. The multi-layer film of claim 1, wherein said ethylene α-olefin copolymers components of said intermediate layer and two outer layers have a density from 0.900 to 0.940 gram per cubic centimeter.

5. The multi-layer film of claim 1, wherein said ethylene α-olefin copolymers components of said intermediate layer and said two outer layers contains from 1 to 20% by weight of an α-olefin having from 3 to 20 carbon atoms.

6. The multi-layer film of claim 1, having a thickness of from 50° to 200°μ.

7. The multi-layer film of claim 1, wherein both of said outer layers comprise from 98 to 50% by weight of said ethylene α-olefin copolymer and from 2 to 50% by weight of said low density polyethylene produced by the high pressure polymerization method.

8. The multi-layer film of claim 1, having a thickness of from 50° to 200°μ and wherein both of said outer layers comprise from 98 to 50% by weight of said ethylene α-olefin copolymer and from 2 to 50% by weight of said low density polyethylene produced by the high pressure polymerization method.

9. The multi-layer film of claim 8, wherein said ethylene α-olefin copolymers components of said intermediate layer and two outer layers have a density from 0.900 to 0.940 gram per cubic centimeter.

10. The multi-layer film of claim 9, wherein said intermediate layer contains from 20 to 80% by weight of said copolymer and between 80 to 20% by weight of said high density polyethylene and wherein said outer layers contain from 4 to 40% by weight of said low density polyethylene produced by the high pressure polymerization method.

11. The multi-layer film of claim 10, wherein said outer layers contain from 5 to 30% by weight of said low density polyethylene produced by the high pressure polymerization method.

12. The multi-layer film of claim 11, wherein said intermediate layer contains from 25 to 60% of said high density polyethylene.

13. The multi-layer film of claim 1, wherein said outer layers contain from 5 to 30% by weight of said low density polyethylene produced by the high pressure polymerization method.

14. The multi-layer film of claim 1, wherein said intermediate layer contains from 25 to 60% of said high density polyethylene.

15. The multi-layer film of claim 1, wherein said outer layers contain from 5 to 30% by weight of said low density polyethylene produced by the high pressure polymerization method and wherein said intermediate layer contains from 25 to 60% of said high density polyethylene.

16. The multi-layer film of claim 7, wherein said outer layers contain from 5 to 30% by weight of said low density polyethylene produced by the high pressure polymerization method.

17. The multi-layer film of claim 7, wherein said intermediate layer contains from 25 to 60% of said high density polyethylene.

18. The multi-layer film of claim 7, wherein said outer layers contain from 5 to 30% by weight of said low density polyethylene produced by the high pressure polymerization method and wherein said intermediate layer contains from 25 to 60% of said high density polyethylene.

19. The multi-layer film of claim 1, wherein said high density polyethylene of said intermediate layer has a density from 0.948 to 0.965 gram per cubic centimeter.

20. The multi-layer film of claim 1, wherein said high density polyethylene of said intermediate layer has a melt index from 0.02 to 2 grams per ten minutes.

21. The multi-layer film of claim 1, which is prepared by co-extruding resin materials for said intermediate layer and resin materials for said two outer layers with a die of the in-die adhesion type.

22. The multi-layer film of claim 1, which is prepared by kneading resin materials for said intermediate layer and resin materials for said two outer layers, co-extruding these kneaded resin materials with a die of the in-die adhesion type, and then molding said co-extruded materials by an inflation method.

* * * * *